US009760592B2

(12) United States Patent
Huang et al.

(10) Patent No.: US 9,760,592 B2

(45) Date of Patent: Sep. 12, 2017

(54) METRICS MANAGEMENT AND MONITORING SYSTEM FOR SERVICE TRANSITION AND DELIVERY MANAGEMENT

(71) Applicant: International Business Machines Corporation, Armonk, NY (US)

(72) Inventors: Pu Huang, Yorktown Heights, NY (US); Kaan K. Katircioglu, Yorktown Heights, NY (US); Ta-Hsin Li, Danbury, CT (US); Ying Li, Mohegan Lake, NY (US); Axel Martens, White Plains, NY (US); Richard B. Segal, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 14/185,453

(22) Filed: Feb. 20, 2014

(65) Prior Publication Data

US 2015/0236934 A1 Aug. 20, 2015

(51) Int. Cl.

*G06F 15/16* (2006.01)
*G06F 17/30* (2006.01)
*G06Q 10/06* (2012.01)
*H04L 12/26* (2006.01)
*H04L 12/24* (2006.01)

(52) U.S. Cl.

CPC ....... *G06F 17/30371* (2013.01); *G06Q 10/06* (2013.01); *H04L 41/12* (2013.01); *H04L 41/22* (2013.01); *H04L 43/04* (2013.01); *H04L 41/142* (2013.01)

(58) Field of Classification Search

None

See application file for complete search history.

(56) References Cited

U.S. PATENT DOCUMENTS 6,424,971 B1 7/2002 Kreulen et al.
6,804,665 B2 10/2004 Kreulen et al.
6,804,670 B2 10/2004 Kreulen et al.
6,829,734 B1 12/2004 Kreulen et al.
7,503,000 B1 3/2009 Kreulen et al.
7,792,786 B2 9/2010 Chen et al.
7,810,029 B2 10/2010 Holland et al.
2003/0050908 A1 3/2003 Kreulen et al.
2004/0199616 A1* 10/2004 Karhu .................... H04L 29/06 709/221
2006/0233342 A1* 10/2006 Thione .................... H04L 12/66 379/221.09
2007/0112748 A1 5/2007 Angell et al.
2008/0243889 A1 10/2008 Chen et al.

(Continued)

*Primary Examiner* — Philip Chea

*Assistant Examiner* — Van Kim T Nguyen

(74) *Attorney, Agent, or Firm* — Scully, Scott, Murphy & Presser, P.C.; Louis J. Percello, Esq.

(57) ABSTRACT

A service engagement map may be generated based on data collected associated with the service transition and delivery processes. The service engagement map may be refined iteratively by discovering additional data associated with the service transition and delivery processes and updating the service engagement map according to the additional data. Engagement metrics may be computed based on the service engagement map and presented. The service engagement map may also be presented visually.

17 Claims, 4 Drawing Sheets

(56) References Cited

U.S. PATENT DOCUMENTS

| | | | | |
|---|---|---|---|---|
| 2008/0288266 | A1 | 11/2008 | Diao et al. | |
| 2009/0117851 | A1* | 5/2009 | Malaney ............... | H04W 24/00 455/67.11 |
| 2009/0254492 | A1 | 10/2009 | Diao et al. | |
| 2009/0292660 | A1 | 11/2009 | Behal et al. | |
| 2010/0131854 | A1* | 5/2010 | Little .................... | G06F 3/0486 715/735 |
| 2010/0145940 | A1 | 6/2010 | Chen et al. | |
| 2014/0295804 | A1* | 10/2014 | Naqvi ................... | H04W 4/001 455/414.1 |
| 2015/0081838 | A1* | 3/2015 | Stockhammer ......... | H04L 67/10 709/217 |

* cited by examiner

METRICS MANAGEMENT AND MONITORING SYSTEM FOR SERVICE TRANSITION AND DELIVERY MANAGEMENT

FIELD

The present application relates generally to computers, and computer applications, and more particularly to metrics management and monitoring system for service transition and delivery management.

BACKGROUND

Services transition refers to taking over a service operation such as application management, customer service management, transaction management, and launching a new process for managing the operation. Delivery process refers to an ongoing, regular process of managing and maintaining a service operation such as the above after the service transition has been completed. Such services transition and delivery processes have specific characteristics, e.g., they are human driven, document centric, highly flexible processes. They also have dynamic tasks with flexible input and output formats.

Standardized workflow management and monitoring tools are not appropriate to manage services transition and delivery processes because, for instance, typical information technology (IT) artifacts are email, spreadsheets, project plans, sometimes having content and knowledge management.

Requirements on time and budget do not allow for full data and process integration. Data and resources are logically and physically distributed and are heterogeneous, making full data and process integration difficult. Business insight through monitoring and metrics is required to increase profitability.

Existing systems and approaches to monitor well established processes and data may include business intelligence systems and metric dashboard. However, they require full data integration and metrics modeling prior to becoming operational. Data mining and process mining technologies may be used to discover structures and frequencies in documents and execution traces. However, such technology is applied on specific business domain with specific mining targets. Business provenance and correlation discovery may provide for generic mechanism to express and extend representation of business operations. Again, however, the technology is applied with specific provenance types and procedures.

BRIEF SUMMARY

A method of monitoring service transition and delivery processes, in one aspect, may comprise generating a service engagement map based on data collected associated with the service transition and delivery processes. The service engagement map may comprise a collection of artifacts in relation with one another that are relevant to the service transition and delivery processes. The method may also comprise refining the service engagement map iteratively by discovering additional data associated with the service transition and delivery processes and updating the service engagement map according to the additional data. The method may also comprise computing engagement metrics based on the service engagement map. The method may further comprise presenting the computed engagement metrics.

A system for monitoring service transition and delivery processes, in one aspect, may comprise a monitoring module operable to execute on a computer processor and further operable to generate a service engagement map based on data collected associated with the service transition and delivery processes. The service engagement map may comprise a collection of artifacts in relation with one another that are relevant to the service transition and delivery processes. The monitoring module may be further operable to refine the service engagement map iteratively by discovering additional data associated with the service transition and delivery processes and update the service engagement map according to the additional data. The monitoring module may be further operable to compute engagement metrics based on the service engagement map. A user interface module may be operable to execute on a computer processor and further operable to present the computed engagement metrics.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
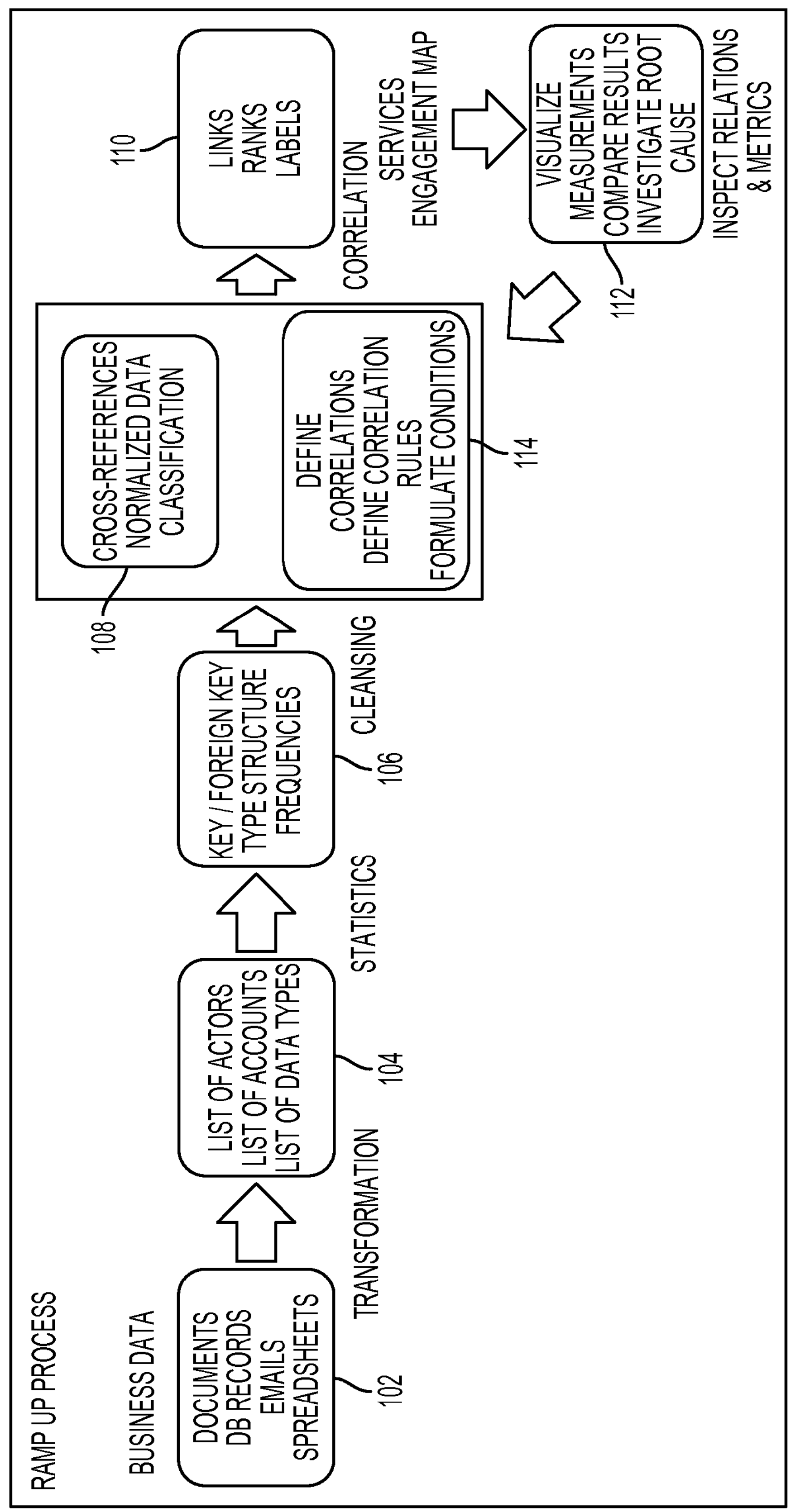
FIG. 1 is a diagram illustrating a ramp up process of a methodology of the present disclosure in one embodiment.

A methodology is disclosed for establishing a view on processes. The methodology in one embodiment may derive information such as “Who did what when, why, and how?” related to services transition and delivery processes, for example, through data mining and discovery. The methodology in one embodiment may establish framework with out-of-the-box and engagement specific metrics. In one aspect, the methodology may take advantage of specific characteristics in services engagements, e.g., user directories, contract database, services vocabulary, and others. The methodology may also incorporate a wide variety of data formats and storage mechanisms, for example, extending focus on information or artifacts such as spreadsheets, team rooms, emails, free-form documents. The methodology may further produce a service engagement map and core metrics out-of-the-box, e.g., create hierarchy of opportunities, stage, and activity with resources and time stamps. The methodology in another aspect may enable one-click definition of milestones and stages, for example, using instances to select objects and to assign category and measurement. The methodology yet in another aspect may provide a development methodology for rapid prototyping and organic grows, for example, including fast ramp up phase and continuous refinement next to steady state runtime behavior.

In one embodiment of the methodology of the present disclosure, service engagement maps may be established based on a variety of business artifacts, such as: project plans, spreadsheets, emails, employee profiles, database entries and content repositories, and others. A service engagement map is a collection of artifacts in relation with each other that are relevant to a service operation, and transition activities. These artifacts include elements such as project plans, people, data, contract documents, process documents, manuals, email and other correspondence, etc. Service engagement map may comprise artifacts of one or more service operations. A service engagement may comprise one or more sub-service engagements.

The methodology of the present disclosure may also comprise analyzing such one or more service engagement maps to produce metrics on duration, frequency, utilization, and status, and/or other information, of business artifacts.

Yet in another aspect, the methodology of the present disclosure in one embodiment may compare service engagement maps to identify similarities, detect outliers, and calculate the distance of instances. One way of defining a similarity measure between two or more service engagements is by defining the similarity of artifacts in each service engagement. Each artifact can constitute a dimension of the similarity measure. For example, an instance (or a dimension) of a similarity measure of two service engagements is the similarity of the skills of the people who worked on both engagements; another instance (or dimension) of a similarity measure is the similarity of applications used in both service engagements; another instance (or dimension) of a similarity measure is the similarity of the data fields used in the service engagements. One way of defining distances between two or more service measures is by taking simple or weighted average of one or more of the above similarity measures. One way of detecting outliers is by using known statistical outlier detection methods.

Still yet in another aspect, the methodology of the present disclosure in one embodiment may establish and consolidate the list of key actors, stages (e.g., phases), document classes and search tags for one or more service engagements. Hence one or more service engagements may be mapped in a service engagement map through their related artifacts. Actors can include people, groups of people, organizations. Stages can include documenting the current process of service operation, creating a transition plan, creating a resource plan, acquiring resources, executing the transition plan. Document classes can include contracts, manuals, process documents, operational plans, technical documents, directories, project plans, etc. Search tags are searchable key words that help classify documents.

The methodology of the present disclosure in one embodiment may also calculate the relevance of resources, documents, and tasks in service engagements. Resources can include people, groups of people, software skills, business roles, software applications or tools. Documents can include contracts, manuals, process documents, operational plans, technical documents, directories, project plans. Tasks can include all activities needed to perform the transition and delivery of service operation such as acquiring resources, planning and executing operations.

The methodology of the present disclosure in one embodiment may improve productivity, for example, by providing a flexible tooling for data and knowledge management, efficient search and document retrieval in business context, and greater awareness of status changes and recent developments. The methodology of the present disclosure in one embodiment may also improve visibility, for example, providing oversight on end-to-end operations, 360° view on context of business artifacts and actors, and flexible metrics and deep analytics. The methodology of the present disclosure in one embodiment may also function as a base for advanced planning, for example, by providing one or more functionalities such as identifying pattern and trends, predicting resource demands and road blocks, providing impact analysis, and others.

Figure 2:
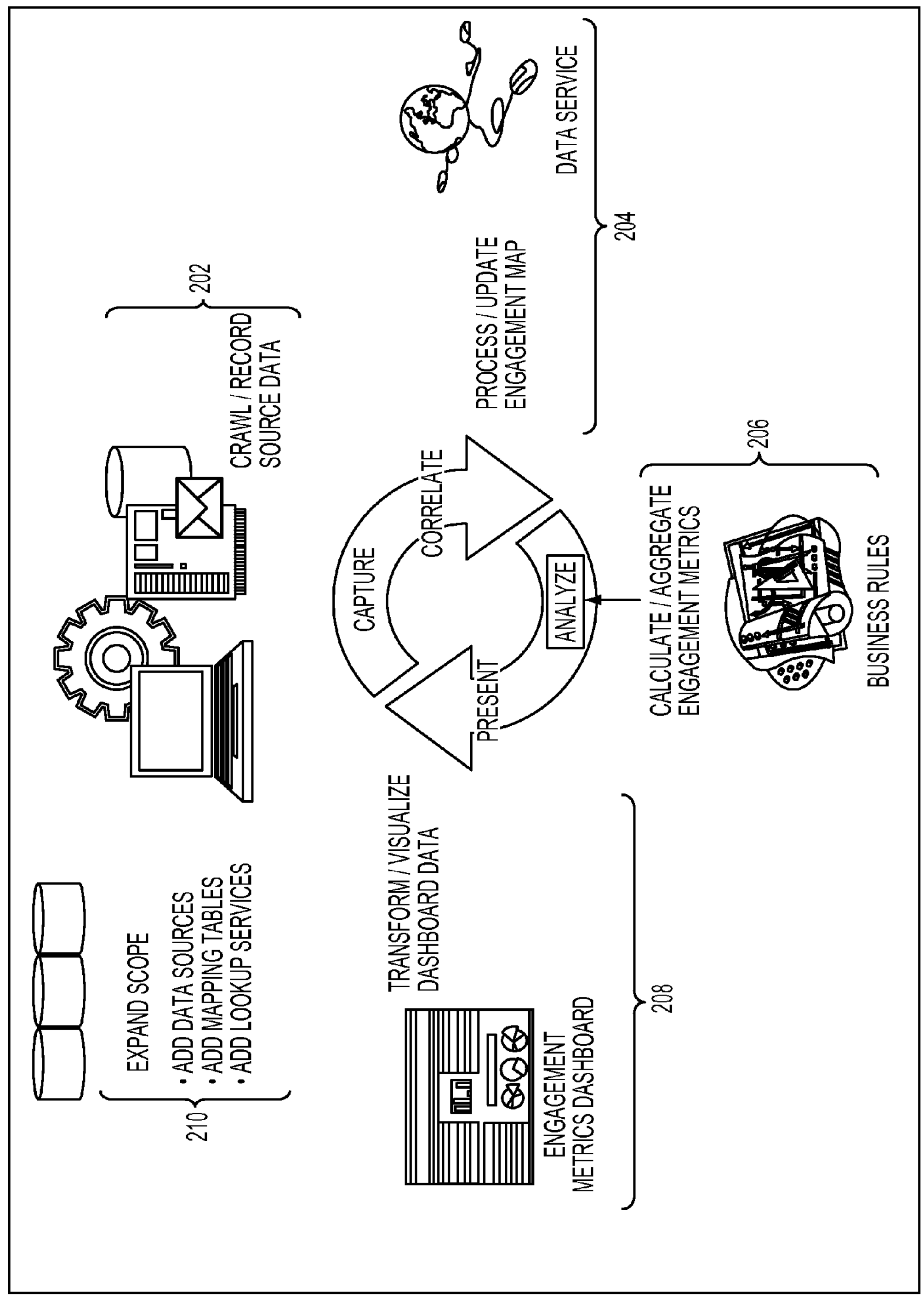
FIG. 2 is a diagram illustrating a run time process in a methodology of the present disclosure in one embodiment.
Figure 3:
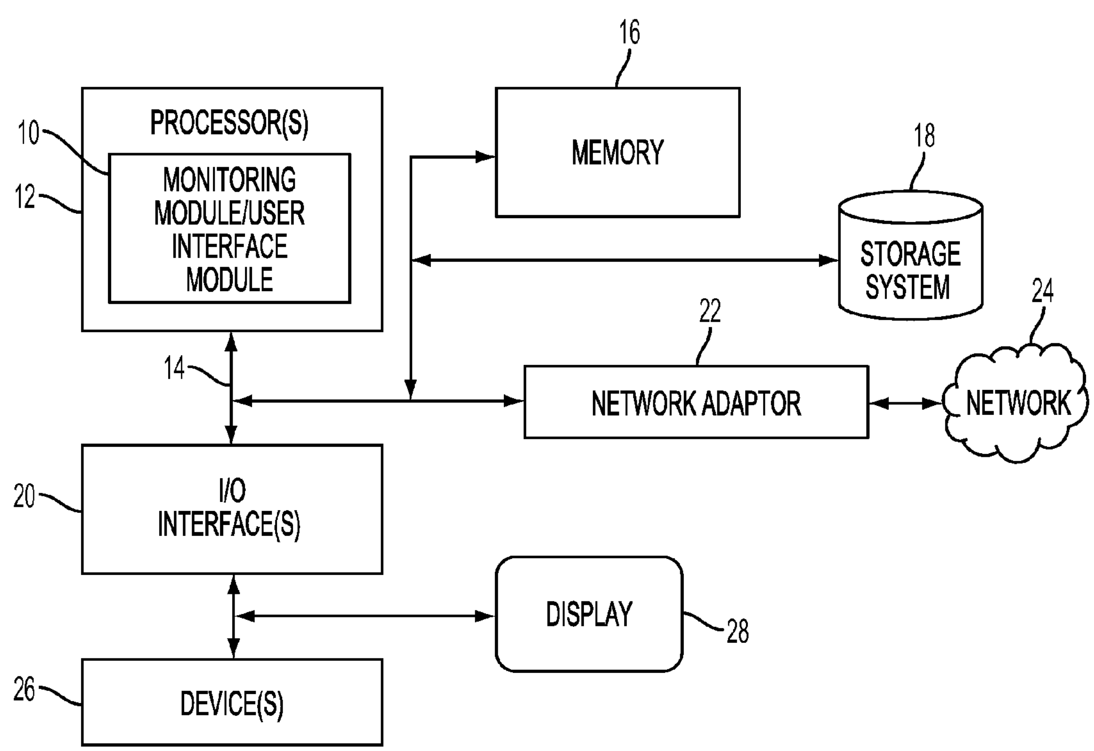
FIG. 3 illustrates a schematic of an example computer or processing system that may implement the monitoring system in one embodiment of the present disclosure.

FIG. 1 is a diagram illustrating a "ramp up" process in a methodology of the present disclosure in one embodiment. The process is "ramped up" in a sense that when a service transition starts, initially fewer data may be available. As the transition progresses, more and more data may become available. The ramp up process provides for continuous evolution of data collection and analysis process, e.g., as also shown in FIG. 2. At 102, business data such as documents, database records, emails, and spreadsheets are obtained. Documents may include project plans, names of resources, data fields, descriptions and values, contract documents, process documents, manuals, email and other correspondence.

At 104, the data is transformed, e.g., into a list of actors, a list of accounts, and a list of data types. Actors can include people, groups of people, organizations. Accounts can include client or customer name, company name, name of a person or name of a group, etc. Data types can include text, numeric, general, date, etc. Data types can also be defined in terms of document classes such as contracts, manuals, process documents, operational plans, technical documents, directories, project plans, etc. In one embodiment of the present disclosure, transformation operation is performed on the content of the data available as "business data". This operation extracts the artifact types and values for those artifact types and puts all of them in a directory. For instance, it identifies people names, group or organization names, etc. It also identifies data such as application names, skills, recognizable (e.g., standard) technical terms and stores them in a directory. As a method of the transformation operation, a known universal list of artifact names can be used as an input to support the transformation operation. Another method is to use known text mining techniques to create a list of artifacts and their values, to be verified by users.

At 106, statistics on the transformed data is generated. For example, the frequency count of occurrences of artifact values (e.g., names of people, names of software applications, names of locations, names of data fields) are calculated and stored for each service engagement. Then, a relational structure between service engagements may be created by calculating the frequency of occurrences of common artifact values or values that have similar meaning (e.g., city or town, sales or revenue, project manager, delivery manager, etc.). Similar meanings can be gathered from a master directory to aid the method of determining if artifact values are similar. Degree of relationship between service engagements is also calculated using similarity and distance measures (see above definition of similarity). As an example of creating a relational structure between service engagements, consider a simple example case in which usage of Database X occurs 50 times in a service engagement and usage Database Y occurs 5 times in the same service engagement. This service engagement has a 10 times stronger relationship with Database X than Database Y. Other methods may be used to build a relationship.

Similarly, consider that another service engagement has documents where Database X occurs 100 times and Database Z occurs 200 times. Both service engagements have relationship through Database X and the strength can be measured, e.g., as (100/200)*(50/55). This example relationship measure is a product of the rates at which Database X is mentioned (i.e., number of times Database X is mentioned divided by the number of times any Database is mentioned) in both service engagements. Furthermore, the two service engagements have no relationship through Databases Y and Z (or the strength of their relationship is zero). Other more sophisticated relationship measures can be used.

At 108, cleansing is performed. In the cleansing process, artifact values are cross-checked in all data coming from all service operations in "business data". For instance, the artifact values are cross-checked in that similar values are identified and grouped together (e.g., clustering technique may be used to group similar values); spelling errors or different ways of spelling the same artifact value are recognized and values are either corrected or maintained to be in the same group.

At 110, correlation is performed. Based on the cleansed artifact values, correlations of service engagements are recalculated. For instance, the processing at 106 identifies values and their frequencies. The processing at 108 cross references and cleanses artifact values. The processing at 110 re-does the processing of 106 with the cross-referenced and cleansed data. The processing at 106-108-110 can be viewed as the steps of a single cleansing and relationship building process. Links are defined as relationships between artifacts. For instance, skill type Database programmer can be linked to Business Warehouse Application, or a person name "John Doe" linked to Java™ skill, or a location such as New York, or a specific process design document linked to Customer Relationship Management application. The links are identified by using the relational data generated in steps 106 and cleansed in step 108.

For example, the processing at 106 generates the artifact types and values. For instance, "people" is an artifact type. "John Doe" and "John Do" are two values. In the cleansing process at 108, John Doe and John Do are identified to be the same person. Similar cleansing process may be performed for other artifacts such as applications, groups, locations, etc. Once the cleansing is done, relations (or links) are also updated. For instance, before cleansing John Do may not have been related to ABC application, but once John Do is identified to be the same person as John Doe who did a lot of ABC work, John Do then is related to ABC.

Artifact values are related to each other through their relationship measures (for example, one of which is the occurrence in the same document (e.g., John Doe knows ABC application and hence they are related artifact values of people and application types). Service engagements have many artifacts and artifact values that have relationships. Therefore, service engagements are also related to each other through their artifacts.

Ranks are defined as the relative strength of a link. For instance, if John Doe is recorded to be involved in project plans as a project manager 20 times, and database administrator 5 times, the value "John Doe" of person artifact type is linked to the value "project manager" of skill type artifact 4 times stronger than it is linked to the "data administrator" value of the skill type artifact. Labels are all artifact values and their attributes that are gathered in step 104, correlated in step 106, cleansed in step 108. For instance, "John Doe" is a label that has attributes of "database", "project manager", "New York", "database administrator", etc.

In one embodiment of the present disclosure, a process may continuously refine the artifacts, their values, and relations, and ultimately the service engagement maps and their relations. This refinement may be done when new data becomes available. New data may come from additional data that may become available from existing service engagements as the engagements progress or from new engagements. At 112, the results of the process (e.g., service engagement map output of step 110) are presented to users. One way of showing the results to users is through graphical interface that show links between artifact values (labels). Another way is through simple pivot tables (like spreadsheet's pivot table). Graphical interface may present other visualization to show the results. By examining the results the user may discover new correlations, or identify new rules and/or conditions for correlating artifact values. The users input these new correlations and rules and/or conditions (e.g., to a system implementing the process shown in FIG. 1) at 114. Then, the system can recognize the new rules and/or conditions and rerun the steps 108 and 110.

FIG. 2 is a diagram illustrating a methodology of the present disclosure in one embodiment of the present disclosure. At 202, data is obtained. Data capturing at 202 may comprise any discovery method, looking up source documents, records, etc.

At 204, the captured data is correlated, e.g., processed to update an engagement map. For example, the steps 102 through 114 shown in FIG. 1 may be executed to update an engagement map with updated and newly added or captured data 210 at 202.

At 206, the correlated data is analyzed, e.g., measurements and statistics may be computed. Business rules may be applied to calculate and aggregate engagement metrics. Examples of business rules include may mathematical expressions that are used to calculate engagement metrics. They can be as simple as sums or partial sums by groups, averages or weighted averages by groups. They can be as advanced as running an algorithm to calculate them. An example is the probability of on time completion time of a service transition process using simulation techniques or regression models based on past data. Engagement or performance metrics of a service operation may include the effort needed to perform a given activity, on time completion performance of tasks, ticket volume (e.g., number of job requests), ticket resolution times, resource productivity, resource utilization, risk measures (risk of delay, risk of exceeding budget, etc.), list of problems or risks encountered during transition and delivery, etc. At 208, presentation may be performed. For instance, the calculated and/or aggregated data may be presented or visualized in a graphical user interface, e.g., a dashboard or another user interface.

Example visualization is shown in FIG. 5. FIG. 5 shows an example illustration of a dashboard that provides a graphical presentation of the engagement map data. Visualization shown in FIG. 5 is of service operation similarities: applications, skills, ticket types, problem types and their resolutions. Here the nodes in the graph represent different types of artifacts and the lines represent the links that relate the artifacts through the value of their similarity scores or correlations.

Similarity analysis in one embodiment of the present disclosure finds accounts with similar applications, finds people from similar accounts, and finds benchmarks from similar accounts (effort, ticket volume, productivity, problem types, etc.). Problem type similarity analysis may map out clusters of skills used in the account and identify a resource for a particular ticket type using problem description and resolution description.

Such visualization may help in better assessing a new account risk and cost, and finding resources for the new account.

Figure 4:
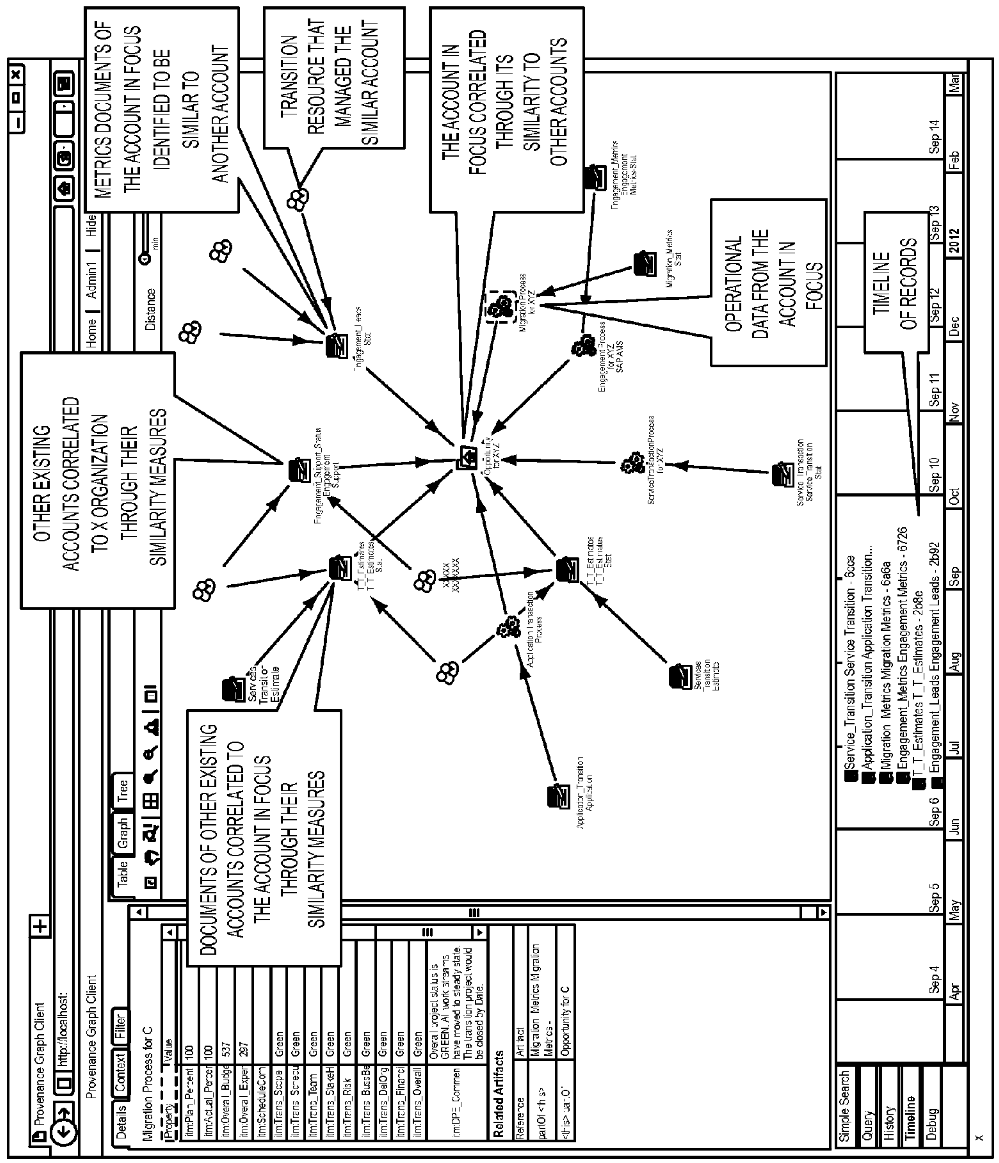
FIG. 4 shows an example illustration of a dashboard that provides a graphical presentation of the engagement map data in one embodiment of the present disclosure.

FIG. 4 illustrates a schematic of an example computer or processing system that may implement the monitoring system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of monitoring service transition and delivery processes, comprising:

generating, by a computer processor, a service engagement map based on data collected associated with the service transition and delivery processes, the service engagement map comprising a collection of artifacts in relation with one another that are relevant to the service transition and delivery processes;

refining, by the computer processor, the service engagement map iteratively by discovering additional data associated with the service transition and delivery processes and updating the service engagement map according to the additional data;

computing, by the computer processor, engagement metrics based on the service engagement map; and presenting, by the computer processor, the computed engagement metrics;

wherein the generating comprises:

obtaining the data associated with operations of the service transition and delivery processes;

transforming the data into a list of actors, a list of accounts and a list of data types, the list of actors comprising names of people, names of groups of people, names of organization and application names, the list of accounts comprising client names, the list of data types comprising document classes, numeric data type and text data type, the transforming the data comprising executing a text mining technique to create the list with associated values of the actors, the accounts and the data types;

generating statistics on the transformed data;

based on the statistics, forming relationships between at least two or more of the actors, the accounts and the data types;

cleansing the transformed data; and recalculating the relationships based on the transformed data that is cleansed, wherein the service engagement map comprises the relationships formed between at least two or more of the actors, the accounts and the data types; and wherein the presenting further comprises generating and displaying visualization comprising graphical nodes representing the artifacts comprising the actors, the accounts and the data types, and edges linking the graphical nodes representing the artifacts in relation with one another, the visualization providing a graphical view on a display device, of the service transition and delivery processes that shows how the service transition and delivery processes are mapped via the artifacts, wherein the relationships further comprise strength of a relationship between the service transition and delivery processes, the strength determined by a product of rates of a particular article discovered in the service transition and delivery processes connected by the relationship.

2. The method of claim 1, wherein the statistics comprises frequency of occurrences of at least the actors, the accounts and the data types in the data.

3. The method of claim 1, wherein the service engagement map is generated for each of a plurality of service engagements, and the method further comprises forming relationships between at least two of the service engagements based on the statistics associated with said each of the plurality of service engagements.

4. The method of claim 3, wherein the relationships between at least two of the service engagements are formed based on frequency of occurrences of common artifacts in the at least two of the service engagements.

5. The method of claim 4, wherein the graphical user interface comprises a dashboard.

6. The method of claim 1, wherein the refining comprises:

obtaining the additional data in response to determining that new data is available; and transforming the data with the additional data into a list of actors, a list of accounts and a list of data types;

generating statistics on the transformed data;

based on the statistics, forming relationships between at least two or more of the actors, the accounts and the data types;

cleansing the transformed data;

recalculating the relationships based on the cleansed data, wherein the service engagement map comprises the relationships formed between at least two or more of the actors, the accounts and the data types.

7. The method of claim 1, wherein presenting comprises visualizing the computed engagement metrics in a graphical user interface.

8. A non-transitory computer readable storage medium storing a program of instructions executable by a machine to perform a method of monitoring service transition and delivery processes, the method comprising:

generating, by a computer processor, a service engagement map based on data collected associated with the service transition and delivery processes, the service engagement map comprising a collection of artifacts in relation with one another that are relevant to the service transition and delivery processes;

refining, by the computer processor, the service engagement map iteratively by discovering additional data associated with the service transition and delivery processes and updating the service engagement map according to the additional data;

computing, by the computer processor, engagement metrics based on the service engagement map; and presenting, by the computer processor, the computed engagement metrics;

wherein the generating comprises:

obtaining the data associated with operations of the service transition and delivery processes;

transforming the data into a list of actors, a list of accounts and a list of data types, the list of actors comprising names of people, names of groups of people, names of organization and application names, the list of accounts comprising client names, the list of data types comprising document classes, numeric data type and text data type, the transforming the data comprising executing a text mining technique to create the list with associated values of the actors, the accounts and the data types;

generating statistics on the transformed data;

based on the statistics, forming relationships between at least two or more of the actors, the accounts and the data types;

cleansing the transformed data; and recalculating the relationships based on the transformed data that is cleansed, wherein the service engagement map comprises the relationships formed between at least two or more of the actors, the accounts and the data types; and wherein the presenting further comprises generating and displaying visualization comprising graphical nodes representing the artifacts comprising the actors, the accounts and the data types, and edges linking the graphical nodes representing the artifacts in relation with one another, the visualization providing a graphical view on a display device, of the service transition and delivery processes that shows how the service transition and delivery processes are mapped via the artifacts, wherein the relationships further comprise strength of a relationship between the service transition and delivery processes, the strength determined by a product of rates of a particular article discovered in the service transition and delivery processes connected by the relationship.

9. The non-transitory computer readable storage medium of claim 8, wherein the statistics comprises frequency of occurrences of at least the actors, the accounts and the data types in the data.

10. The non-transitory computer readable storage medium of claim 8, wherein the service engagement map is generated for each of a plurality of service engagements, and the method further comprises forming relationships between at least two of the service engagements based on the statistics associated with said each of the plurality of service engagements.

11. The non-transitory computer readable storage medium of claim 10, wherein the relationships between at least two of the service engagements are formed based on frequency of occurrences of common artifacts in the at least two of the service engagements.

12. The non-transitory computer readable storage medium of claim 8, wherein the refining comprises:

obtaining the additional data in response to determining that new data is available; and transforming the data with the additional data into a list of actors, a list of accounts and a list of data types;

generating statistics on the transformed data;

based on the statistics, forming relationships between at least two or more of the actors, the accounts and the data types;

cleansing the transformed data;

recalculating the relationships based on the cleansed data, wherein the service engagement map comprises the relationships formed between at least two or more of the actors, the accounts and the data types.

13. The computer readable storage medium of claim 8, wherein presenting comprises visualizing the computed engagement metrics in a graphical user interface.

14. A system for monitoring service transition and delivery processes, comprising:

a computer processor;

the computer processor further operable to generate a service engagement map based on data collected associated with the service transition and delivery processes, the service engagement map comprising a collection of artifacts in relation with one another that are relevant to the service transition and delivery processes, the computer processor further operable to refine the service engagement map iteratively by discovering additional data associated with the service transition and delivery processes and update the service engagement map according to the additional data, the computer processor further operable to compute engagement metrics based on the service engagement map; and the computer processor further operable to present the computed engagement metrics, wherein the computer processor is further operable to obtain the data associated with operations of the service transition and delivery processes, the computer processor is further operable to transform the data into a list of actors, a list of accounts and a list of data types, the computer processor is further operable to generate statistics on the transformed data, based on the statistics, the computer processor is further operable to form relationships between at least two or more of the actors, the accounts and the data types, the computer processor is further operable to cleanse the transformed data, the computer processor is further operable to recalculate the relationships based on the cleansed data, to generates the service engagement map, wherein the service engagement map comprises the relationships formed between at least two or more of the actors, the accounts and the data types, the computer processor further generates and displays visualization comprising graphical nodes representing the artifacts comprising the actors, the accounts and the data types, and edges linking the graphical nodes representing the artifacts in relation with one another, the visualization providing a graphical view on a display device, of the service transition and delivery processes that shows how the service transition and delivery processes are mapped via the artifacts, wherein the relationships further comprise strength of a relationship between the service transition and delivery processes, the strength determined by a product of rates of a particular article discovered in the service transition and delivery processes connected by the relationship.

15. The system of claim 14, wherein the statistics comprises frequency of occurrences of at least the actors, the accounts and the data types in the data.

16. The system of claim 14, wherein the service engagement map is generated for each of a plurality of service engagements, and the computer processor is further operable to form relationships between at least two of the service engagements based on the statistics associated with said each of the plurality of service engagements.

17. The system of claim 16, wherein the relationships between at least two of the service engagements are formed based on frequency of occurrences of common artifacts in the at least two of the service engagements.

* * * * *